United States Patent [19]

Tanaka et al.

[11] Patent Number: 5,256,030

[45] Date of Patent: Oct. 26, 1993

[54] METHOD AND APPARATUS FOR TAKING AWAY GLASS PLATES STOOD ON A PALLET WHILE REMOVING SPACERS

[75] Inventors: Mamoru Tanaka; Takanori Toyoda; Takao Tomioka, all of Mie, Japan

[73] Assignee: Central Glass Company, Limited, Ube, Japan

[21] Appl. No.: 899,272

[22] Filed: Jun. 16, 1992

[30] Foreign Application Priority Data

Jun. 18, 1991 [JP] Japan .................. 3-146317

[51] Int. Cl.$^5$ .................................. B65G 59/00
[52] U.S. Cl. .......................... 414/798.9; 414/789.5; 414/797; 414/929; 221/211; 221/212
[58] Field of Search ................ 414/798.9, 797, 789.5, 414/797.1, 637, 627, 929, 793.2; 221/211, 212; 901/40

[56] References Cited

U.S. PATENT DOCUMENTS 4,093,083  6/1978  Klaus .................. 414/798.9

FOREIGN PATENT DOCUMENTS

| | | |
|---|---|---|
| 3928850 | 3/1991 | Fed. Rep. of Germany . |
| 2548633 | 1/1985 | France . |
| 61-3823 | 2/1986 | Japan . |
| 0162649 | 6/1989 | Japan .................. 414/798.9 |
| 2-26855 | 7/1990 | Japan . |
| 2-225225 | 9/1990 | Japan . |
| 1648758 | 6/1991 | U.S.S.R. .................. 901/40 |

*Primary Examiner*—David H. Bollinger
*Assistant Examiner*—Carol Wallace
*Attorney, Agent, or Firm*—Keck, Mahin & Cate

[57] ABSTRACT

The disclosure relates to a spacer for spacing two adjacent glass plates which are stood parallel to each other on a pallet. The spacer has a spacing plate part to be inserted between the two glass plates and a head part which rests on the upper edges of the two glass plates. According to the invention the spacer has a magnetic part which is formed of an easily magnetizable magnetic material and fixed to the spacing plate part. In taking away a plurality of glass plates stood in a parallel arrangement on a pallet one after another, the glass plate in the forefront is held by a plurality of suction pads mounted on a frame which is attached to a robot arm, and each of the spacers on that glass plate is removed by attracting it by an electromagnetic holder movably mounted on the frame and swinging the electromagnetic holder to separate the spacer from the glass plate held by the suction pads and then disabling the electromagnetic holder to allow the spacer to fall.

12 Claims, 3 Drawing Sheets

METHOD AND APPARATUS FOR TAKING AWAY GLASS PLATES STOOD ON A PALLET WHILE REMOVING SPACERS

BACKGROUND OF THE INVENTION

This invention relates to a method and apparatus for taking away a plurality of glass plates, which are stood on a pallet in a parallel arrangement, one after another while removing spacers used to space adjacent glass plates in their upper marginal areas, and to the construction of the aforementioned spacers.

For storage or transportation of glass plates it is often customary to stand a plurality of glass plates in a parallel arrangement on a pallet having an upright backstay. The base of the pallet is provided with fixed spacers in order to stand the glass plates at short intervals, and the glass plates are slightly leaned against the backstay of the pallet or a stopper protruding from the backstay. To prevent every glass plate from making contact with the adjacent glass plates it is usual to insert relatively small and detachable spacers between the glass plates in areas near the upper edge of every glass plate. Usually the detachable spacers have a partitioning plate part and a head part which is thicker than the partitioning plate part and hence can rest on the upper edges of the spaced two glass plates. For example, JP 61-3823 (Utility Model) shows a spacer of this form.

When the glass plates standing on the pallet are to be carried away one after another, the aforementioned detachable spacers must be removed one by one. The spacers can be removed by manual operation, but the manual operation entails high cost.

JP 2-26855 (Utility Model) proposes to suspend a plurality of rubber spacers in the shape of a flat plate from a belt of cloth by using a pair of wires or ropes for each spacer. According to this proposal, when the spaced glass plates on a pallet are taken away one after another the spacers can be automatically removed by pulling the aforementioned belt by a wire which is wound on a roller mounted on the backstay of the pallet. However, for this method it is necessary to mount a pair of rollers on the backstay of every pallet, and therefore it becomes impossible to stack a plurality of pallets on top of another.

Recently it has become customary to use a robot to take away glass plates standing on a pallet one after another. In most cases an attachment having a plurality of suction pads is attached to a robot arm as shown, for example, in JP 2-225225 A. When such a robot is used it is desirable that the spacers intervening near the upper edge of each glass plate can easily be removed by the robot. Actually, however, very intricate means are needed for automatically removing the conventional spacers by a robot.

SUMMARY OF THE INVENTION

It is an object of the present invention to provide a spacer which is for spacing two adjacent glass plates standing on a pallet in their upper marginal areas and can easily be removed by an automated mechanism when the glass plates are taken away one after another.

Also it is an object of the invention to provide a readily automatable method for taking away a plurality of glass plates standing in a parallel arrangement on a pallet one after another while removing spacers inserted between adjacent glass plates in their upper marginal areas.

It is still another object of the invention to provide a glass plate takeout apparatus for performing the method according to the invention.

A spacer according to the invention is for spacing two adjacent glass plates which are stood parallel to each other on a pallet, and the spacer comprises a spacing plate part, a head part which is formed on and contiguous to an upper edge of the spacing plate part and has a greater thickness than the spacing plate part such that when the spacing plate is inserted between the two glass plates the head part rests on upper edges of the two glass plates, and a magnetic part which is formed of an easily magnetizable magnetic material and fixed to the spacing plate part.

Another aspect of the invention is a method for taking away a plurality of glass plates standing on a pallet one after another, the glass plates being stood in a parallel arrangement by using at least one spacer to space two adjacent glass plates in their upper marginal areas, the spacer having a spacing plate part and a head part which is formed on and contiguous to an upper edge of the spacing plate part such that when the spacing plate part is inserted between the two glass plates the head part rests on the upper edges of the two glass plates. The method according to the invention comprises the steps of (a) before standing the glass plates on the pallet providing the spacer with a magnetic part which is formed of an easily magnetizable magnetic material and fixed to the spacing plate part, (b) holding a target glass plate which is in the forefront of the parallel arrangement on the pallet and on which the spacer rests such that the spacing plate part is on the front side of the target glass plate, (c) while holding the target glass plate, attracting the magnetic part of the spacer on the target glass plate by an electromagnet to cause the spacer to stick to the electromagnet and moving the electromagnet so as to separate the spacer from the target glass plate, (d) after step (c) disabling the electromagnet to allow the spacer to fall while holding the target glass plate, and (e) after step (d) transferring the target glass plate to a destination.

Preferably the step (d) of this method has the substep of blowing a pressurized gas against the spacer when the electromagnet is disabled to thereby promote the detachment of the spacer from the electromagnet.

Besides, with respect to a plurality of glass plates which are stood in a parallel arrangement on a pallet by using at least one spacer according to the invention to space two adjacent glass plates, the invention provides an apparatus for taking away the glass plates one after another. The apparatus comprises a frame which provides a nearly vertical reference plane, means for tilting the frame forward and rearward and swinging the frame toward the right and toward the left, a plurality of suction pads which are mounted on the frame so as to come into contact with a target glass plate which is in the forefront of the parallel arrangement on the pallet when the frame approaches the target glass plate in such an attitude that the aforementioned reference plane is parallel to the target glass plate, an electromagnetic holder which comprises an electromagnet and is movably mounted on the frame such that when a spacer rests on the target glass plate such that the spacing plate part of the spacer is on the front side of the target glass plate the electromagnetic holder is directed toward the spacer, means for advancing the electromagnetic holder toward the target glass plate and retreating the electromagnetic holder from an advanced position, means for energizing and deenergizing the electromagnet of the electromagnetic holder, and means for swinging the electromagnet holder.

It is suitable to attach the frame of this apparatus to a robot arm. When two spacers according to the invention are used to space two adjacent glass plates on the pallet, the apparatus according to the invention has two electromagnetic holders in positions corresponding to the positions of the two spacers.

Preferably the apparatus includes means for blowing a pressurized gas against the spacer sticking to the electromagnetic holder for the purpose mentioned hereinbefore.

As will be understood from the above statements the spacers according to the invention can easily be removed by using electromagnetic holders which are convenient for employment in an automated apparatus for taking away glass plates standing on a pallet one after another. Therefore, it is possible to considerably reduce the total cost of the transfer of the glass plates from the pallet to a destination such as a predetermined position on a conveyor. In using the spacers according to the invention there is no need of modifying conventional pallets.

DESCRIPTION OF THE PREFERRED EMBODIMENTS

Figure 1:
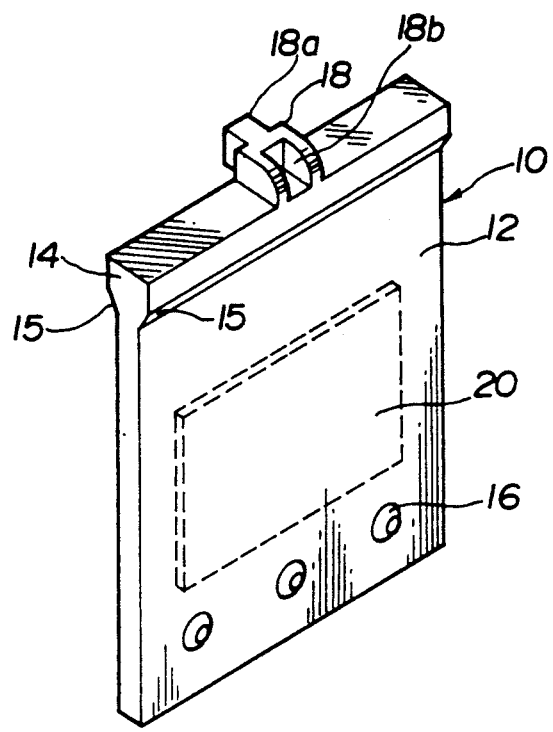
FIG. 1 is a perspective view of a spacer according to the invention.

FIG. 1 shows a spacer 10 according to the invention. The spacer 10 has a major part 12 in the form of a rectangular plate, which serves as a spacing plate, and a head part 14 which protrudes upward from the upper edge of the major part 12 and is thicker than the major part 12. The major part 12 and the head part 14 constitute a unitary member which is, for example, formed of a synthetic resin or rubber. On both sides of the spacer 10 the lower end of the head part 14 is a gently tapered edge 15. In using the spacer 10 to space two glass plates which are stood in parallel the major part 12 of the spacer intervenes between two glass plates, and the head part 14 rests on the upper edges of the two glass plates by the contact of the two edges 15 of the spacer 10 with the upper edges of the respective glass plates.

A piece 20 of a thin sheet of an easily magnetizable magnetic material such as, for example, iron, mild steel or ferrite is embedded in the major part 12 of the spacer 10. Alternatively the magnetic piece 20 may be attached to a surface of the major part 12 by using an adhesive or an adhesive film. Usually the magnetic piece 20 has a considerably smaller area than the major part 12 and is positioned in a central region of the major part 12. The rectangular shape of the magnetic piece 20 in FIG. 1 is by way of example and may be altered to any other shape.

Figure 2:
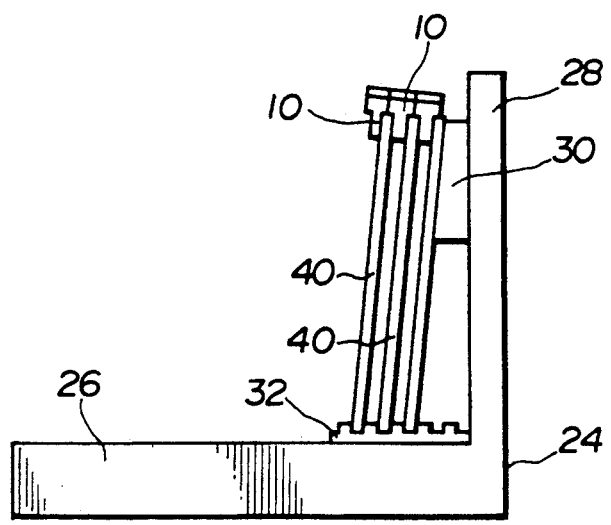
FIG. 2 is a side elevational view of a pallet on which glass plates are stood by using spacers according to the invention to keep the glass plates spaced.

FIG. 2 illustrates the manner of standing a plurality of glass plates 40 on a pallet 24 and keeping the glass plates 40 spaced by using a plurality of spacers 10 according to the invention. The pallet 24 has a base 26 and an upright backstay 28. The glass plates 40 are stood parallel to each other on a set of spacers 32 which are fixedly placed on the base 26 of the pallet 24, and the glass plates are leaned against a set of stoppers 30 protruding from the backstay 28. Besides the fixed spacers 32 on the base 26, the spacers 10 according to the invention are used to keep the entire area of each glass plate 40 spaced from the adjacent glass plate(s). As can be seen in FIG. 2, the spacer 10 is a small member by comparison with each glass plate 40. For example, the spacer 10 is about 50 mm square. Therefore, to keep apart two adjacent glass plates 40 it is usual to use two spacers 10 at a suitable horizontal interval between the two spacers 10.

In some cases the glass plates 40 have a coating in an upper marginal area (possibly in other marginal areas too), and it will be undesirable that the major part 12 of each spacer 10 makes contact with the coating. Aside from such a coating, when the magnetic piece 20 of the spacer 10 is on a surface of the major part 12 it will be favorable to prevent the magnetic piece 20 from making rubbing contact with glass plate 40 to thereby prevent the glass plate from being scratched or soiled. Therefore, as shown in FIG. 1, it is a preferable option to form a plurality of small semispherical or button-like bumps 16 on each surface of the major part 12 of the spacer 10 at suitable locations in a lower region of the major part 12.

The head part 14 of the spacer 10 has an upward protuberance 18 in a middle section. On one side of the head part 14 the protuberance 18 has a short, horizontal projection 18a, and on the opposite side the protuberance 18 is formed with a recess 18b such that the horizontal projection 18a of another spacer 10 enters this recess 18b when the two spacers are closely positioned as shown in FIG. 2. The recess 18b is formed as shown in FIG. 1 so that the projection 18a of another (second) spacer 10 can be extracted from this recess 18b by moving the second spacer either upward or rearward.

Figure 3:
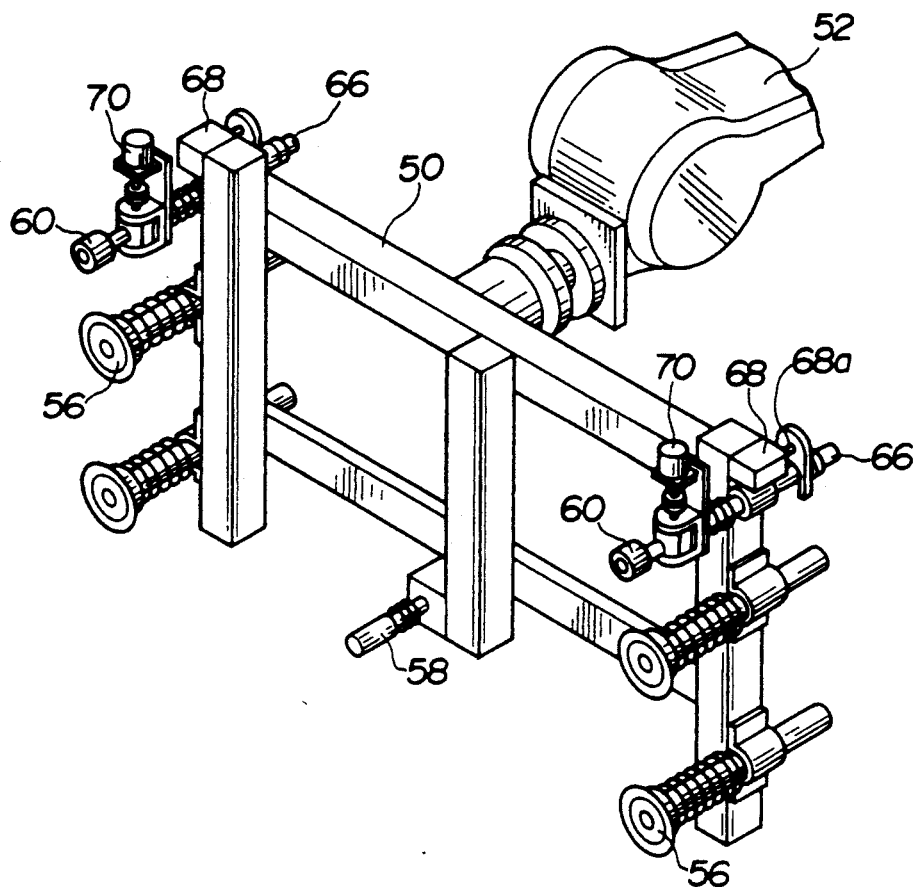
FIG. 3 is a perspective view of an apparatus according to the invention for taking away the glass plates on the pallet individually while removing the spacers.

FIG. 3 shows a takeout apparatus according to the invention, which is used to take away the glass plates 40 standing on the pallet 24 one after another in order to transfer the glass plates, for example, to a carriage or a conveyor and automatically remove the spacers 10.

The mechanically basic part of the takeout apparatus is a frame 50 which is attached to an arm 52 of a robot (not shown). The frame 50 provides a nearly vertical plane, and the arm 52 can advance and retreat, can rotate upward and downward and can swing toward the right and toward the left. A plurality of suction pads 56 are attached to the frame 50 such that all the suction pads 56 come into contact with a flat surface parallel to the frame 50 when the frame 50 straightly approaches that surface. The suction pads 56 communicate with a source of vacuum (not shown) through piping and a suitable valve (not shown). A proximity sensor 58 is attached to the frame 50 to detect the distance between a reference point of the frame 50 and a target, viz. a glass plate 40 on the pallet 24. The proximity sensor 58 can be selected from conventional proximity sensors of various types using ultrasonic wave, high-frequency radio wave, photoelectric transducer or a change in electrostatic capacitance.

Figure 4:
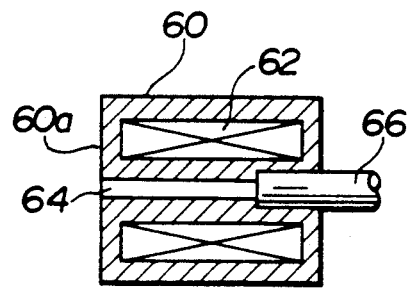
FIG. 4 is a schematic and sectional view of an electromagnetic holder in the apparatus of FIG. 3.

A pair of electromagnetic holders 60 are mounted on the frame 50 at a level higher than the suction pads 56. Each of the two electromagnetic holders 60 is used to remove one of the spacers 10 in FIG. 2. Since two spacers 10 are used to space two adjacent glass plates 40 as described hereinbefore, the takeout apparatus has two electromagnetic holders 60. The horizontal distance between the two electromagnetic holders 60 approximately coincides with the horizontal distance between the vertical centers of the two spacers 10. As shown in FIG. 4 each electromagnetic holder 60 contains an electromagnetic winding 62 and has a flat face 60a at the front end. Each electromagnetic holder 60 is supported by a tube 66 which is longitudinally movably mounted on the frame 50, and a pneumatic cylinder 68 having a piston rod 68a is mounted on the frame 50 to advance and retreat the tube 66. The tube 66 is connected to a source of compressed air via an electromagnetic valve (not shown), and the front face 60a of the electromagnetic holder 60 is formed with a spout hole 64 which communicates with the tube 66. The electromagnetic holder 60 is swingable, and for each electromagnetic holder 60 a pneumatic motor 70 is mounted on the frame 50 to swing the electromagnetic holder 60 toward the right or toward the left.

In operation, the robot arm 52 brings the frame 50 into a position opposite to the glass plates 40 on the pallet 24 and further advances the frame 50 until the suction pads 56 come into contact with the glass plate 40 in the forefront (referred to as the first glass plate). The proximity sensor 58 detects the contact of the suction pads 56 with the first glass plate and provides a signal indicative of the contact. In response to that signal the arm 52 stops, and vacuum is applied to the suction pads 56, whereby the first glass plate is held by the suction pads 56. At the same time the pneumatic cylinder 68 for each electromagnetic holder 60 is operated so as to advance the support tube 66 toward the first glass plate until the front face 60a of the electromagnetic holder 60 comes close to one of the two spacers 10 resting on the first glass plate. Then an electric current is supplied to the winding 62 in each electromagnetic holder 60 to produce magnetic force which attracts the spacer 10 having the magnetic piece 20 to the holder 60. As the result the spacer 10 sticks to the front face 60a of the electromagnetic holder 60.

Then the arm 52 retreats or rotates upward to move the first glass plate 40 together with the spacers 10 thereon. By this motion each spacer 10 on the first glass plate detaches from the adjacent spacer 10. During this motion the pneumatic cylinders 68 are operated to retreat the tubes 66, and the pneumatic motors 70 are operated to swing each electromagnetic holder 60 toward the right or toward the left. As the result the spacer 10 sticking to each electromagnetic holder 60 detaches from the first glass plate which is still held by the suction pads 56. Then the supply of the current to the winding 62 in each electromagnetic holder 60 is terminated, and at the same time compressed air is supplied to each electromagnetic holder 60 through the tube 66 to cause the compressed air to spout from the hole 60a. As the result the two spacers 10 detach and fall off from the two electromagnetic holders 60, respectively. Since the electromagnetic holders 60 have already been retreated and swung as mentioned above the falling spacers 10 do not collide with the glass plate which is still held by the suction pads 56. The spacers 10 fall into a box (not shown) for recovery. Then the arm 52 is further moved to transfer the frame 50 to a destination such as a predetermined position of a conveyor, and then the suction pads 56 are relieved from vacuum to deposit the first glass plate onto the conveyor. After that the arm 52 returns the frame 50 to the initial position, while the pneumatic motors 70 are operated so as to reversely swing the electromagnetic holders 60 to resume the straightly forward-directed position.

Theoretically the detachment of the spacer 10 from each electromagnetic holder 60 can be accomplished by terminating the supply of a current to the winding 62. However, the jet of compressed air is employed in order to prevent a delay in the detachment by the effect of residual magnetism. It suffices to use only slightly compressed air, but it is preferable to use dry air in order to prevent the spacers 10 from being soiled with drain.

In the takeout apparatus of FIG. 3 the frame 50 is brought into a position parallel to the glass plates 40 standing on the pallet 24 by preprogrammed movements of the robot arm 52. However, there is a possibility that the angle of the lean of each glass plate 40 changes while a plurality of glass plates are taken away one after another, because it is likely that the movement of the glass plate held by the suction pads 56 of the apparatus causes a slight movement of the next glass plate by the action of a negative pressure produced in the gap between the two glass plates. Therefore, there is a possibility that the frame 50 will not become accurately parallel to the target glass plate 40, and hence a half of the plurality of suction pads 56 might fail to firmly hold the glass plate so that the glass plate might fall from the takeout apparatus while the apparatus is moving toward the destination. To solve this problem it is preferable to modify the takeout apparatus of FIG. 3 in the following points.

Figure 5:
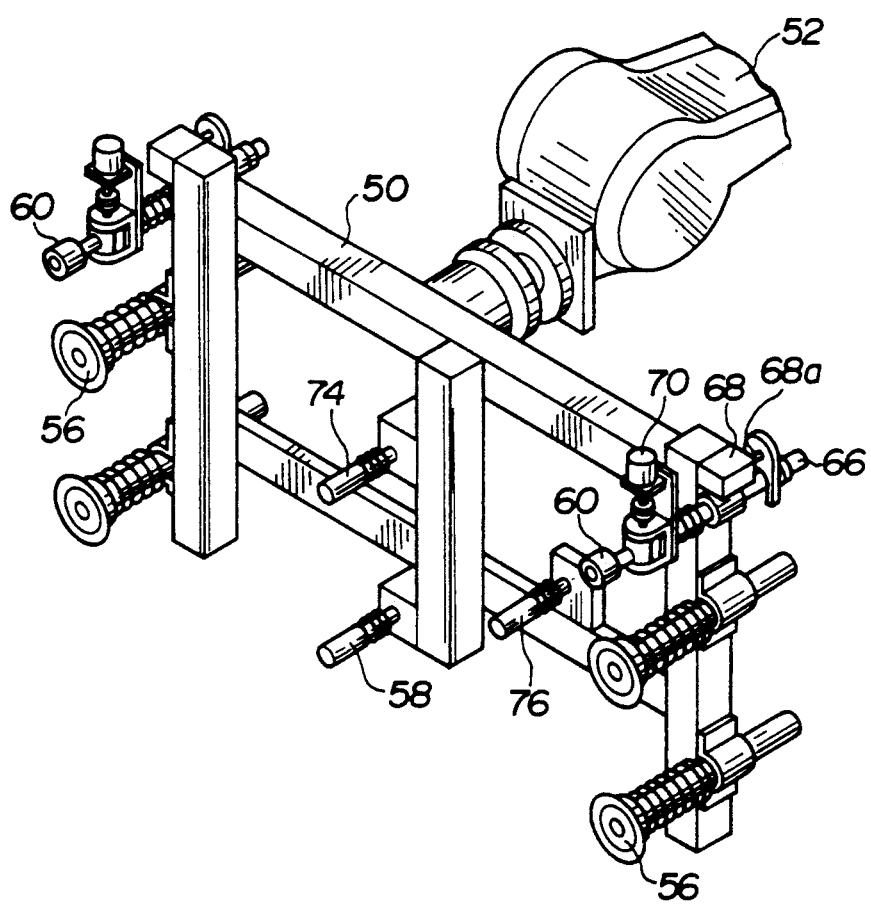
FIG. 5 shows a preferred modification of the apparatus of FIG. 3.

In the apparatus of FIG. 5 the frame 50, suction pads 56 and electromagnetic holders 60 are respectively similar to the counterparts in FIG. 3.

In the apparatus of FIG. 5 the robot arm 52 can tilt the frame 50 forward and rearward and swing the frame 50 toward the right and toward the left and can precisely control the degree of tilting or swinging. This apparatus has three proximity sensors, viz. first sensor 58, second sensor 74 and third sensor 76. These sensors 58, 74, 76 can be selected from conventional proximity sensors of various types, as mentioned with respect to the proximity sensor 58 in FIG. 3. Of course it is suitable that the three proximity sensors 58, 74, 76 are of the same type and same characteristics.

Each of the three proximity sensors 58, 74, 76 is mounted on the frame 50 to detect the distance between the target glass plate 40 on the pallet 24 and the frame 50 at the position of each proximity sensor. The first proximity sensor 58 is provided at a position suitable for detecting the distance between the frame 50 and the target glass plate on the assumption that the frame 50 is parallel or nearly parallel to the glass plate. The second and third proximity sensors 74 and 76 are respectively spaced from the first proximity sensor 58. The position of the second sensor 74 is above or below the horizontal plane containing the center axis of the first sensor 58, and the position of the third sensor 76 is on the right-hand or left-hand side of the vertical plane containing the center axis of the first sensor 58. In other words, the first and second proximity sensors 58 and 74 are spaced so as to be at different vertical distances from the lower end of the frame 50, whereas the first and third proximity sensors 58 and 76 are spaced so as to be at different horizontal distances from a side end of the frame 50. Therefore, in a front elevational view of the apparatus of FIG. 5 a triangle can be drawn by connecting the three proximity sensors 58, 74, 76.

The operation of the takeout apparatus of FIG. 5 is fundamentally similar to the operation of the apparatus of FIG. 3. When the frame 50 arrives at a predetermined short distance from the target glass plate 40 on the pallet 24 the robot arm 52 and the frame 50 come to rest in response to a signal from the first proximity sensor 58. Then a signal from the second proximity sensor 74 is checked to judge whether the distance measured by the second sensor 74 differs from the distance measured by the first sensor 58. If there is a difference between the two measured distances the robot arm 52 tilts the frame 50 forward or rearward until the difference disappears. Next a signal from the third proximity sensor 76 is checked to judge whether the distance measured by the third sensor 76 differs from the distance measured by the first sensor 58. If there is a difference between the two measured distances the robot arm 52 swings the frame 50 toward the right or toward the left until the difference disappears. By these correction operations the frame 50 becomes accurately parallel to the target glass plate 40.

After that the suction pads 56 and the electromagnetic holders 60 are operated in the same manner as in the apparatus of FIG. 3 to take away the target glass plate 40 and remove the spacers 10 resting on the target glass plate. In taking away the glass plates 40 on the pallet 24 one after another, the above described adjustment of the parallelism between the frame 50 and the target glass plate is made for each of the glass plates 40. Therefore, every glass plate 40 is firmly held by the suction pads 56 and safely transferred to the destination.

What is claimed is:

1. A spacer for spacing two adjacent glass plates which are stood parallel to each other on a pallet, the spacer comprising:
   a spacing plate part;
   a head part which is formed on and contiguous to an upper edge of said spacing plate part and has a greater thickness than said spacing plate part such that when said spacing plate is inserted between said two glass plates the head part rests on upper edges of the two glass plates; and
   a magnetic part which is formed of an easily magnetizable magnetic material and fixed to said spacing plate part.

2. A spacer according to claim 1, wherein said magnetic part is embedded in said spacing plate part.

3. A spacer according to claim 1, wherein said magnetic part is attached onto a major surface of said spacing plate part.

4. A spacer according to claim 1, wherein said spacing plate part is formed of a synthetic resin.

5. A spacer according to claim 1, wherein said spacing plate part is formed of a rubber.

6. A spacer according to claim 1, wherein said head part comprises a relatively short projection which projects substantially perpendicular to a plane parallel to said spacing plate part and is formed with a recess such that said projection of another spacer of the same construction can enter said recess.

7. A method for taking away a plurality of glass plates standing on a pallet one after another, the glass plates being stood in a parallel arrangement by using at least one spacer to space two adjacent glass plates in their upper marginal areas, the spacer having a spacing plate part and a head part which is formed on and contiguous to an upper edge of the spacing plate part such that when the spacing plate part is inserted between the two glass plates the head part rests on the upper edges of the two glass plates, the method comprising the steps of:
   (a) before standing said glass plates on said pallet, providing said spacer with a magnetic part which is formed of an easily magnetizable magnetic material and fixed to said spacing plate part;
   (b) holding a target glass plate which is in the forefront of the parallel arrangement on said pallet and on which said spacer rests such that said spacing plate part is on the front side of the glass plate;
   (c) while holding the target glass plate, attracting said magnetic part of said spacer on the target glass plate by an electromagnet to cause said spacer to stick to the electromagnet and moving the electromagnet so as to separate said spacer from the target glass plate;
   (d) after step (c) disabling said electromagnet to allow said spacer to fall while holding the target glass plate; and
   (e) after step (d) transferring said target glass plate to a destination.

8. A method according to claim 7, wherein the step (d) comprises the sub-step of blowing a pressurized gas against said spacer when said electromagnet is disabled to thereby promote the detachment of the spacer from the electromagnet.

9. An apparatus for taking away a plurality of glass plates standing on a pallet one after another, the glass plates being stood in a parallel arrangement by using at least one spacer to space two adjacent glass plates in their upper marginal areas, the spacer having a spacing plate part, a head part which is formed on and contiguous to an upper edge of the spacing plate part such that when the spacing plate part is inserted between the two glass plates the head part rests on the upper edges of the two glass plates and a magnetic part which is formed of an easily magnetizable magnetic material and fixed to the spacing plate part, the apparatus comprising:
   a frame which provides a nearly vertical reference plane;
   means for tilting said frame forward and rearward and swinging said frame toward the right and toward the left;
   a plurality of suction pads which are mounted on said frame so as to come into contact with a target glass plate which is in the forefront of the parallel arrangement on said pallet when said frame approaches the target glass plate in such an attitude that said reference plane is parallel to the target glass plate;
   an electromagnetic holder which comprises an electromagnet and is movably mounted on said frame such that, when said spacer rests on said target glass plate such that said spacing plate part of the spacer is on the front side of the target glass plate, the electromagnetic holder is directed toward said spacer;
   means for advancing said electromagnetic holder toward said target glass plate and retreating the electromagnetic holder from an advanced position;
   means for energizing and deenergizing said electromagnet of said electromagnetic holder; and
   means for swinging said electromagnetic holder.

10. An apparatus according to claim 9, further comprising means for blowing a pressurized gas against said spacer when the spacer is sticking to said electromagnetic holder.

11. An apparatus according to claim 9, further comprising a proximity sensor which is mounted on said frame to provide a signal indicative of the distance between said target glass plate and said frame at the position of the proximity sensor.

12. An apparatus according to claim 9, further comprising first, second and third proximity sensors each of which is mounted on said frame to provide a signal indicative of the distance between said target glass plate and said frame at the position of each proximity sensor, the first and second proximity sensors being spaced so as to be at different vertical distances from the lower end of the frame, the first and third proximity sensors being spaced so as to be at different horizontal distances from a side end of the frame.

* * * * *